United States Patent [19]

Nakajima et al.

[11] Patent Number: 4,882,108
[45] Date of Patent: Nov. 21, 1989

[54] METHOD FOR PRODUCING POLYPROPYLENE FOAM

[75] Inventors: Yoshio Nakajima; Takao Kimura; Yoshinobu Nagaoka, all of Yokkaichi, Japan

[73] Assignee: Mitsubishi Petrochemical Co., Ltd., Tokyo, Japan

[21] Appl. No.: 178,940

[22] Filed: Apr. 7, 1988

[30] Foreign Application Priority Data

Apr. 13, 1987 [JP] Japan .................................. 62-88880

[51] Int. Cl.$^4$ ........................... B29C 67/22; C08J 9/06
[52] U.S. Cl. ....................... 264/54; 264/45.3; 264/338; 264/DIG. 16; 264/DIG. 18
[58] Field of Search .................. 264/51, 54, DIG. 16, 264/338, DIG. 18, 45.3

[56] References Cited

U.S. PATENT DOCUMENTS 4,552,708  11/1985  Kimura et al. ........................ 264/53

Primary Examiner—Philip Anderson
Attorney, Agent, or Firm—Armstrong, Nikaido, Marmelstein, Kubovcik & Murray

[57] ABSTRACT

A method of producing a crosslinked, uniformly foamed article of a polypropylene resin is provided. The polypropylene resin containing a crosslinking agent and a foaming agent is extruded through a long-land die which is provided with a choking die at an intermediate portion thereof; a lubricant is provided on the inner surface of the long-land die; the crosslinking agent is decomposed in the front stage of the long-land die; and the foaming agent is decomposed in the rear stage of the long-land die.

An ethylene-propylene random copolymer resin which contains 2 to 10 wt. % of ethylene and has a melt flow rate of 5 g/10 minutes or more at 230° C. and a melt expansion ratio of 1.4 of less at 190° C. is used as the polypropylene resin.

7 Claims, 1 Drawing Sheet

METHOD FOR PRODUCING POLYPROPYLENE FOAM

BACKGROUND OF THE INVENTION

Polypropylene foamed articles, with their excellent mechanical strength and heat resistance among synthetic resin foamed articles having light weight and thermal insulating properties, are important as housing and industrial materials. However, various technical problems arise when large amounts of polypropylene foamed articles are continuously produced, and there are demands for developing the continuous mass-production of polypropylene foamed articles.

The present invention provides a method for the continuous extrusion molding of polypropylene foamed articles. In particular, the present invention relates to a method for extrusion molding which is capable of producing uniform polypropylene foamed articles with low to high degrees of foaming and, particularly, those having large thickness.

An example of conventional methods for producing polypropylene foamed articles is a method in which a crosslinking auxiliary and a chemical foaming agent are mixed with polypropylene to form a sheet which is then crosslinked by ionizing radiation and foamed by heating. However, the maximum thickness of a product which can be obtained by this method is 20 mm because of problems due to the penetration of radiation and heating in subsequent processes. Therefore, the formation of a thick foamed article with this method requires the lamination of several such foamed articles. Another method is also known for producing polypropylene foamed articles in which polypropylene is impregnated with a volatile substance under pressure and is then foamed once to form preliminarily-foamed particles which are then foamed again in a pressure vapor mold. However, this method uses a batch system and thus has problems in that productivity is poor and large foamed articles cannot be easily produced.

The inventors have previously proposed a method which is capable of solving the above-described problems and can continuously produce polypropylene foamed articles (U.S. Pat. No. 4,552,708). In this method, the crosslinking of polypropylene and decomposition of a foaming agent are performed in a long-land die provided with a choking portion, followed by foaming. According to this method a polypropylene foamed article can be continuously provided. However, since the crosslinking agent and the foaming agent must be decomposed not in an extruder but in a subsequent long-land die, it is necessary to control the temperature of the extruder as low as possible. It is therefore necessary to select a polypropylene resin with as low a melting point as possible and with a high melt flow rate, and to uniformly mix a crosslinking agent and a foaming agent with the resin at as low a temperature as possible and extrude the thus-obtained mixture toward and inlet of the long-land die.

However, even if a polypropylene resin satisfying the above-described requirements alone is selected, cracks often emerge in the surface of the produced foamed article, and thus a foamed article with good appearance is not easily obtained. The inventors have achieved the present invention with a view to solving the above-described problems.

SUMMARY OF THE INVENTION

The present invention provides a method for producing a polypropylene foamed article comprising the steps of uniformly melt-mixing a polypropylene resin with a crosslinking agent and a foaming agent; extruding the thus-obtained melted resin into a long-land die in which a lubricant is supplied to an interface between said long-land die and said melted resin from a portion near an inlet of said long-land die with a choking die provided in an intermediate portion of said long-land die so as to apply back pressure to said melted resin in a front stage of said long-land die; heating said resin to cause crosslinking of the resin by thermal decomposition of said crosslinking agent in said front stage of said long-land die; heating said resin to a temperature above the decomposition temperature of said foaming agent in a rear stage of said long-land die; and foaming said resin by extruding it from said long-land die; wherein said polypropylene resin is an ethylene-propylene random copolymer which contains 2 to 10 wt % of ethylene and has a melt flow rate of 5 g/10 minutes or more at 230° C. and a melt expansion ratio of 1.4 or less at 190° C.

Through the method of the present invention, thick foamed articles of good appearance can be provided in low to high foaming ratios, and also extrusion molding of foamed articles having small cell diameters and good elasticity can be achieved with a high rate of productivity.

DETAILED DESCRIPTION OF THE INVENTION

Figure 1:
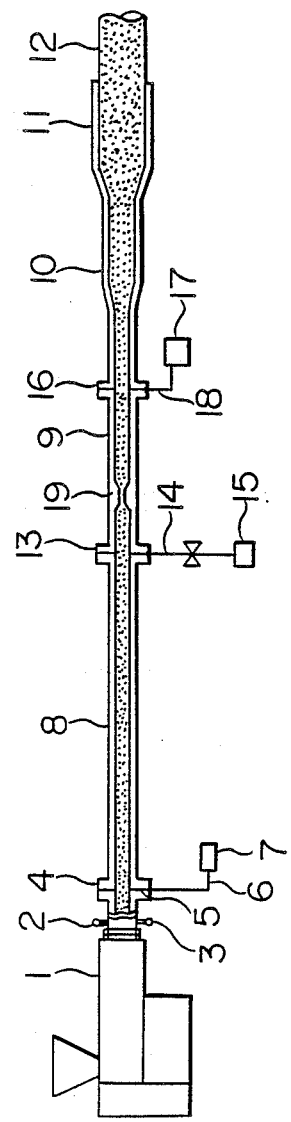
FIG. 1 is a sectional side view of a principal portion of an embodiment of an apparatus to which the present invention is applied.

The polypropylene resin used in the present invention is an ethylene-propylene random copolymer containing ethylene within the range of 2 to 10 wt %. With an ethylene content of below 2 wt %, the melting temperature of the resin rises, resulting in an undesirable product. With an ethylene content of above 10 wt %, the produced foamed article exhibits poor heat resistance. In addition, it is necessary to select a polypropylene resin having a melt flow rate of 5 g/10 minutes or more at 230° C. (measured under a load of 2,160 g in accordance with JIS-K7210) and a melt expansion ratio of 1.4 or less.

The melt expansion ratio is defined as described below. A sample rod is extruded through an orifice which has a length L=8 mm, an internal diameter D=1 mm, and a ratio L/D=8 at 190° C. and a shear rate of 24/second by using a melt indexer in accordance with JIS-K7210. Then the diameter of an extruded sample is measured, and the melt expansion ratio is defined by the following equation:

$$\text{Melt expansion ratio} = \frac{\text{Diameter of extruded sample (mm)}}{\text{Internal diameter of orifice (mm)}}$$

The extruded sample rod is received by a liquid of a density analogous to that of the molten resin at a position within 2 cm from the lower end of the orifice, in order to prevent it being drawn down by its own weight.

With a resin having a melt flow rate of below 5 g/10 minutes or a melt expansion ratio of over 1.4, cracks emerge at surfaces of the obtained foamed article, causing poor appearance.

It is possible to add up to 50 parts by weight of a different kind of thermoplastic resin such as polyethylene and synthetic rubber, and additives such as a plasticizer, pigment, antistatic agent, filler, weathering agent, and electrically conducting agent per 100 parts by weight of the polypropylene resin.

The foaming agent used in the present invention includes compounds which have a decomposition temperature higher than that of the crosslinking agent used, and which generate gases such as nitrogen, carbon dioxide and ammonia when heated to a temperature above the decomposition temperature. Examples of such compounds include azodicarbonamide, metal salts of azodicarbonamide, trihydrazinotriazine, 4,4'-oxybis-benzenesulfonyl semicarbazide, 4,4'-oxybis-benzenesulfonyl hydrazide, and N,N'-dimethyl-N,N'-dinitrosoterephthalamide etc. The amount of foaming agent used is not particularly limited and may be determined to be an appropriate value corresponding to the foaming ratio employed. Usually, the amount is 0.5 to 40 parts by weight, preferably 1 to 30 parts by weight, per 100 parts by weight of the resin. Various foaming auxiliaries and nucleating agents can be used with the foaming agent, as required.

The crosslinking agent used in the present invention comprises a combination of an organic peroxide having a decomposition temperature higher than the melt start temperature of the resin used and an organic compound called a crosslinking accelerator.

Typical examples of the organic peroxide include dialkyl peroxides such as di-tert-butyl peroxide, tert-butylcumyl peroxide, dicumyl peroxide, 2,5-dimethyl-2,5-di-(tert-butyl peroxy)hexane, and $\alpha, \alpha$-bis(tert-butyl peroxy isopropyl)benzene. These compounds may be used in combinations of two or more compounds.

The decomposition temperature of the crosslinking agent represents a temperature at which the half-life period of the organic peroxide is 10 minutes or less.

An example of the organic compound called the crosslinking accelerator is a compound which has at least two vinyl-type double bonds in its molecular structure. Typical examples of such a compound include divinylbenzene, diallylbenzene, divinylbiphenyl, divinylcarbazole, ethylene glycol dimethacrylate, divinylphthalate, and diallylmalate. Of these compounds, aromatic hydrocarbons having two or more vinyl groups are particularly preferable.

Another example of the crosslinking accelerator comprises an aromatic hydrocarbon having one vinyl group and an organic compound having two or more acryloyloxy groups or methacryloyloxy groups in combination in a weight ratio of 1/10 to 10/1. Typical examples of such a combination include combinations of compounds such as styrene, vinyltoluene, ethylvinylbenzene, and N-vinylcarbazole with di, tri or tetra-acrylates or di, tri or tetra-methacrylates of hydroquinone, resorcin, pyrogallol, p-oxybenzyl alcohol, bisphenol A, polyethylene glycol, and glycerin.

With regard to the amount of the crosslinking agent used, the amount of the organic peroxide used is 0.1 to 5 parts by weight and the amount of the crosslinking accelerator used is 0.1 to 10 parts by weight per 100 parts by weight of the polypropylene resin.

When the amount of the crosslinking agent is small, the fluidity of the resin is not sufficiently decreased by crosslinking, making it difficult to produce a thick crosslinked foamed article having a structure of uniform cells therein. On the other hand, when the amount of the crosslinking agent is large, the fluidity of the resin is extremely decreased in the long-land die, making it difficult to produce a crosslinked foamed article having a structure of uniform cells.

A preferable example of the lubricant used in the present invention is a substance which generally does not easily decompose or boil at the molding temperature of the polypropylene resin, is not dissolved in the resin, and is chemically stable so that degradation of the resin is not accelerated. Examples of such a substance include liquid polysiloxanes such as polydimethylsiloxane and polymethylsiloxane, polyhydric alcohols such as ethylene glycol and alkyl esters and alkyl ethers thereof, polyoxyalkylene, and random, block, and graft copolymers of two or more alkylene oxides. Of these substances, it is preferable to use a water-soluble surfactant such as a polyhydric alcohol which is easily removed from the surfaces of a foamed article.

Figure 3:
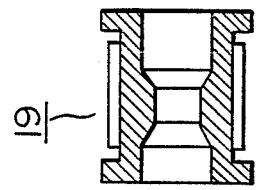
FIG. 3 is a sectional view of an embodiment of a choking die used in the method of the invention.

A detailed description will now be made of a method of extrusion molding a polypropylene foamed article of the present invention, with reference to the process example shown in FIGS. 1, 2 and 3.

A polypropylene resin, a crosslinking agent, and a foaming agent are uniformly melt-mixed in an extruder 1 at a temperature at which the major parts of the crosslinking agent and the forming agent are not decomposed, and are then extruded into a front stage 8 of a long-land die.

A lubricant supply flange 4 which is capable of continuously supplying a lubricant is provided near an inlet of the front or upstream stage 8 of the long-land die which is connected to the extruder 1. A lubricating oil is supplied to the lubricant supply flange 4 from, for example, a lubricant feeder 7 through a pipe 6, and a slit 5 is formed around inner periphery of the supply flange 4 so as to enable the coating of the surface of the melted resin in sliding contact therewith with the lubricant.

Any method or means which causes the lubricant to reach uniformly over the entire internal periphery of the die so as to coat the outer surface of the melted resin can be used for the supply flange 4. For example, a ceramic body having a structure of fine communicating cells can be provided so as to cause the lubricant to leach therefrom and replaced for the supply flange 4.

The reason for supplying the lubricant at a position near the inlet of the long-land die is that the lubricant enables the melted and crosslinked resin to smoothly move in the long-land die since, as crosslinkages are produced in the polypropylene resin by the decomposition of the crosslinking agent, the fluidity of the polypropylene resin is decreased, increasing the resin pressure which could lead to damage to the extruder.

The front stage 8 and an intermediate stage 9 and rear stages 10, 11 of the long-land die, which are described below, are each provided with a heater so as to heat the resin to a given temperature.

In the long-land die, at the front or upstream stage 8, the resin moves at a pressure and temperature at which the foaming agent is not substantially decomposed, and crosslinking of the resin is successively produced during the movement thereof.

It is necessary to control the degree of crosslinking so that a weight ratio of the residue gel (referred to as a gel ratio hereinafter) remaining after the extraction with xylene at a temperature near the boiling point thereof for 10 hours is 5% or more, preferably 10 to 70%, whereby almost all of the gases generated by decomposition of the foaming agent can be used for foaming.

In addition, the length of the front stage 8 of the long-land die which is required for producing crosslinkages in the polypropylene resin with a gel ratio of 5% or more may be determined by the resin temperature, molding speed in the front stage 8, the thermal conductivity of the resin at the molding temperature, and the characteristics of decomposition of the crosslinking agent. In general, the length is preferably 100 to 3,000 cm, a length of below 100 cm being difficult to obtain uniform cells of a foamed article, while a length of above 3,000 cm is unnecessary for obtaining uniform cells.

A choking die 19 is provided in a portion of the long-land die in which the crosslinking of the resin is substantially completed, i.e., an intermediate stage 9 between the front or upstream stage 8 and the rear or downstream stages 10, 11. In other words, in the front stage 8, the crosslinking agent is decomposed by heating at a temperature below the decomposition temperature of the foaming agent under the back pressure produced by the choking die 19 which is provided in the intermediate stage 9 of the long-land die, so that crosslinkages are produced in the polypropylene resin. In general many of the foaming agents which may generally be used in this stage partially decompose to form cells in the resin. In the present invention, however, since back pressure is applied to the resin by the choking die 19, no cells are produced, and the crosslinkages are smoothly produced.

The choking die 19 preferably has a shape in which a choking ratio A/B between a cross-sectional area A of the front stage 8 of the long-land die and a cross-sectional area B of the maximum narrowest choking portion of the choking die 19, in the direction perpendicular to the direction of movement of the resin, is 100/20 to 100/98, preferably 2/1 to 10/9.

It is also possible to combine two or more choking dies each having a choking ratio within or without the above-described range so as to provide the same effect as the above-described choking die, i.e., the effect of applying back pressure to the front stage 8 of the long-land die.

In addition, for example, it is effective to provide a lubricant extraction flange 13 so as to remove the lubricant on the surface of the resin which is supplied in the front stage 8 of the long-land die. The resin from the surface of which the lubricant has been removed has a decreased sliding property on the internal surface of the long-land die, and thus sliding resistance is increased, so that the back pressure in the front stage 8 of the long-land die can be increased.

Figure 2:
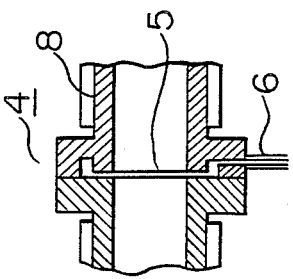
FIG. 2 is a sectional view of an embodiment of a lubricant supply flange used in the method of the invention.

In FIG. 1, reference numeral 14 denotes a pipe, and reference numeral 15 denotes a lubricant receiver.

Desirable back pressure is generally 2 to 100 kg/cm$^2$, and the deviation of back pressure is preferably small from the viewpoint of stability of molding. In addition, the length of the intermediate stage 9 of the long-land die required for controlling the back pressure to a desired value may be determined by the form of the shaped resin article, the amount of lubricant extracted, and the molding speed, and the length is preferably 30 to 500 cm.

Then, the resin is heated to a temperature above the decomposition temperature of the foaming agent in the rear or downstream stages 10, 11 of the long-land die. The polypropylene resin begins to expand from the decomposition of the foaming agent, continues to expand as the cross-sectional area of the rear stages 10, 11 of the long-land die increase, and is finally released as a foamed article 12 from the long-land die.

The present invention configured as described above is capable of producing a low density foamed article having a uniform internal structure, even if the foamed article produced is thick, as well as producing such a foamed article in a continuous process. In addition, notwithstanding the use of a long-land die, the above-described configuration enables a foamed article to be efficiently produced at an increased extrusion speed, without lowering the speed of extrusion molding. Therefore, the present invention enables the production of a uniform low density foamed article of a polypropylene resin which is not easily produced by conventional methods.

Examples of the present invention are described below.

EXAMPLE 1

Pelletized particles consisting of 100 parts by weight of polypropylene resin (an ethylene-propylene copolymer containing 4.5 wt % of ethylene and having a melt flow rate of 22 g/10 minutes and a melt expansion ratio of 1.30) and 12 parts by weight of azodicarbonamide as a foaming agent which had previously been mixed together, 0.5 part by weight of tertiarybutylcumyl peroxide as a crosslinking agent and 0.5 part by weight of divinylbenzene were added to the extruder 1 shown in FIG. 1 and melt-mixed therein.

The extruder 1 extruded the mixture into the front stage 8 of the long-land die having a cross-section of 20 mm×200 mm by using a single screw having an internal diameter of 65 mm and a ratio L/D of 22. A thermometer 2 for the resin which was provided near the outlet of the extruder 1 indicated 158° C. A given amount of polyalkylene glycol derivative as a lubricant was introduced into a flange 4 from a lubricant feeder 7 through a pipe 6, and was supplied through the slit 5 to the interface between the internal wall of the front stage 8 of the long-land die and the resin at a position near the inlet thereof. The length of the front stage 8 of the long-land die was 3 m. In the front stage 8 of the long-land die, the resin was heated with a temperature distribution comprising three steps at 170° C., 173° C. and 175° C. according to resin flow.

The lubricant extraction flange 13 was provided at an end of the front stage 8 of the long-land die so as to remove the lubricant interposed between the resin and the internal wall surface of the long-land die in the front stage 8. The choking die 19 having a choking ratio A/B of 3/2 was provided at the intermediate stage 9 of the long-land die.

The intermediate stage 9 of the long-land die had a length of 1 m and a cross-section of 20 mm×200 mm which was the same as that of the front stage 8 of the long-land die. In the intermediate stage 9 of the long-land die, the resin was heated with a temperature distribution comprising two steps at 176° C. and 178° C. in the direction of movement of the resin. A lubricant supply flange 16 was provided at an end of the intermediate stage 9 of the long-land die so as to again supply the lubricant to the interface between the resin and the internal wall surface of the die from a lubricant feeder 17 through a pipe 18.

The gel ratio of the resin at the outlet of the intermediate stage 9 of the long-land die was 56%.

The resin was then led into the rear stages 10, 11 of the long-land die so that the foaming agent was decomposed by heating. The rear stages 10, 11 had lengths of 2.5 m and 1.5 m and cross-sections of 30×300 mm and 60×600 mm, respectively, and the sizes thereof were gradually increased in the direction of progress of the foaming expansion of the resin. In these stages, the resin was heated with a temperature distribution comprising three steps at 190° C., 200° C. and 180° C. in the direction of the movement of the resin.

The resin was then extruded into the atmosphere from the long-land die to continuously form the crosslinked foamed article 12.

A pressure gauge 3 for the resin provided near the outlet of the extruder 1 indicated 10±5 kg/cm$^2$.

The obtained foamed article had a rectangular cross-sectional form of 58 mm×580 mm, was a continuous foamed board having a skin layer, showed no cracks on the surfaces thereof and a good appearance, and had fine cells with an average size of 600 microns and a density of 0.035 g/cm$^3$.

EXAMPLE 2

An experiment was made in the same way as that employed in Example 1 with the exception that a mixture of 90 parts by weight of an ethylene-propylene random copolymer (containing 3.5 wt % of ethylene and having a melt flow rate of 20 g/10 minutes and a melt expansion ratio of 1.28) and 10 parts by weight of low-density polyethylene (having a melt flow rate of 8 g/10 minutes at 190° C.) was used in place of the 100 parts by weight of the polypropylene resin used in Example 1.

The obtained foamed article showed no cracks on the surfaces thereof and a good appearance, and was a foamed board having fine cells with an average size of 400 microns or below, a density of 0.033 g/cm$^3$, and a skin layer.

COMPARATIVE EXAMPLE 1

Although an experiment was made in the same way as that employed in Example 1 with the exception that a polypropylene homopolymer (having a melt flow rate of 23 g/10 minutes and a melt expansion ratio of 1.30) was used in place of the polypropylene resin used in Example 1, the crosslinking agent and the foaming agent were extremely decomposed at a position near the outlet of the extruder, and thus stable molding could not performed.

COMPARATIVE EXAMPLE 2

An experiment was made in the same way as that employed in Example 1 with the exception that an ethylene-propylene random copolymer (containing 4.0 wt % of ethylene and having a melt flow rate of 25 g/10 minutes and a melt expansion ratio of 1.48) was used in place of the polypropylene resin used in Example 1. Although a foamed article having a density 0.038 g/cm$^3$ was obtained, the obtained foamed article was a board having many cracks produced on the surfaces thereof and poor appearance.

COMPARATIVE EXAMPLE 3

An experiment was made in the same way as that employed in Example 1 with the exception that an ethylene-propylene random copolymer (containing 3.8 wt % of ethylene and having a melt flow rate of 3 g/10 minutes and a melt expansion ratio of 1.30) was used in place of the polypropylene resin used in Example 1. The result was the same as that obtained in Comparative Example 2, and a foamed board having good appearance could not be obtained.

COMPARATIVE EXAMPLE 4

An experiment was made in the same way as that employed in Example 1 with the exception that an ethylene-propylene random copolymer (containing 1.0 wt % of ethylene and having a melt flow rate of 17 g/10 minutes and a melt expansion ratio of 1.28) was used in place of the polypropylene resin used in Example 1. The result was the same as that obtained in Comparative Example 1, and no foamed article could be obtained.

The present invention configured as described above is capable of continuous extrusion molding of a polypropylene crosslinked foamed article and obtaining a large formed article having smooth surfaces and comprising individual fine and uniform cells. Such a foamed article can be widely used as housing and industrial materials, which require heat resistance and rigidity, as it is or after being subjected to further processing.

What is claimed is:

1. A method for producing a polypropylene foamed article, comprising the steps of:
   uniformly melt-mixing a polypropylene resin with a crosslinking agent and a foaming agent;
   extruding the thus-obtained melted resin into a long-land die provided with a choking die in an intermediate portion thereof so as to apply back pressure to the melted resin in a front stage of said long-land die;
   supplying a lubricant to an interface between said long-land die and the melted resin from a portion near an inlet of said long-land die;
   heating the resin to cause crosslinking by the resin by thermal decomposition of the crosslinking agent in said front stage of said long-land die;
   heating the resin to a temperature above the decomposition temperature of the foaming agent in a rear stage of said long-land die;
   foaming the resin by extruding it from said long-land die, wherein said polypropylene resin is an ethylene-propylene random copolymer which contains 2 to 10 wt % of ethylene with a melt flow rate of 5 g/10 minutes or more at 230° C. and a melt expansion ratio of 1.4 or less at 190° C.;
   extracting the lubricant from a surface of the resin at an end of said front stage of said long-land die; and
   supplying the extracted lubricant to an interface between said long-land die and the resin at an end of the intermediate portion.

2. A method of producing a polypropylene foamed article according to claim 1, wherein a crosslinking accelerator is mixed with said polypropylene resin.

3. A method of producing a polypropylene foamed article according to claim 2, wherein said crosslinking accelerator is an organic compound having two or more vinyl-type double bonds in its molecular structure.

4. A method of producing a polypropylene foamed article according to claim 2, wherein said crosslinking accelerator comprises a combination of an aromatic hydrocarbon having one vinyl group and an organic compound having two or more acryloyloxy or methacryloyloxy groups in its molecular structure.

5. A method of producing a polypropylene foamed article according to claim 1, wherein a choking ratio A/B of said choking die, wherein A denotes the cross-sectional area of said front stage of said long-land die and B denotes the cross-sectional area of the maximum choking portion of said choking die, in a direction perpendicular to the direction of movement of the resin is 2/1 to 10/9.

6. A method of producing a polypropylene foamed article according to claim 1, wherein said lubricant is extracted from the surface of said resin at an end of said front stage of said long-land die and is again supplied to an interface between said long-land die and said resin at an end of said intermediate portion.

7. A method of producing a polypropylene foamed article according to claim 1, wherein resin passages in rear stages of said long-land die have cross sections which gradually increase in the direction of movement of the resin.

* * * * *